Patented Oct. 13, 1942

2,298,674

UNITED STATES PATENT OFFICE 2,298,674

OIL FILTER

William G. Burhans, Kingston, N. Y.

Application September 9, 1939, Serial No. 294,127

11 Claims. (Cl. 210—131)

This invention relates to an oil filter and particularly to the type of oil filter containing a replaceable cartridge and adapted for use in motor vehicles to filter the oil circulated for lubricating purposes.

It is the broad object of the present invention to provide a type of oil filter having a greater life than oil filters in general use heretofore by reason of provision for the utilization of a substantially greater proportion of the filtering material.

A further object of the present invention is to provide an oil filter cartridge which may be more readily placed in and removed from the filter casing.

It is a further object of the invention to provide for a larger and more effective sediment chamber in an oil filter of the character indicated.

Figure 1:
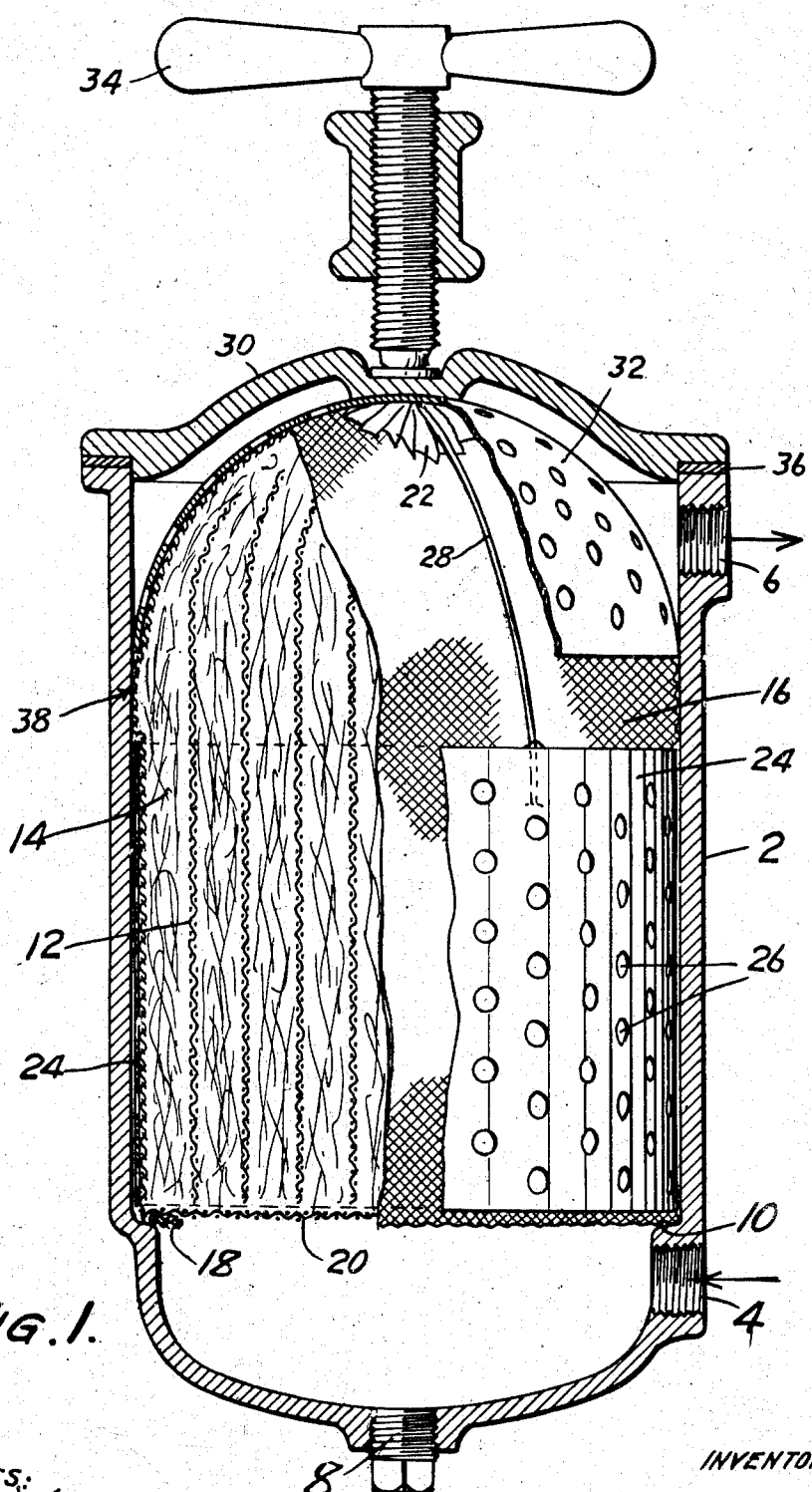
Figure 2:
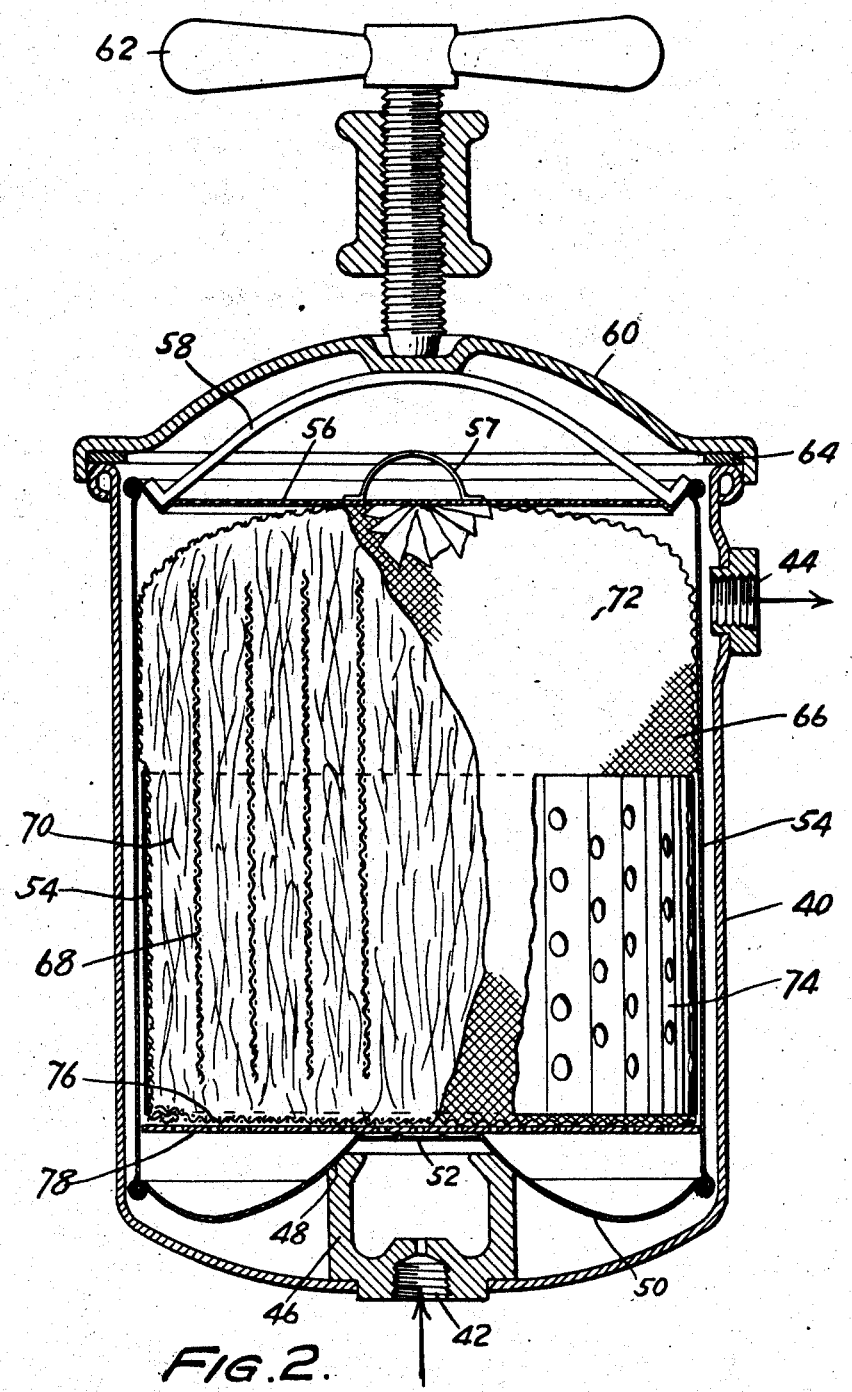

The above and other objects particularly relating to details of construction will be apparent from the following description read in conjunction with the accompanying drawings, in which:

Figure 1 is a vertical section through one preferred embodiment of the invention; and Figure 2 is a similar section through another preferred embodiment of the invention involving a somewhat different type of removable filter unit.

Referring first to Figure 1, there is illustrated therein at 2 a conventional type of casing adapted to receive a filter cartridge and provided with inlet and outlet openings 4 and 6, respectively, and a drain opening 8 located at the bottom of a sediment chamber provided by the space beneath a seat indicated at 10.

The cartridge in this filter is made up of a wire mesh sheet 12, arranged in a spiral with filtering material, such as cotton waste 14, between the convolutions thereof. This spiral arrangement of the mesh and waste, or other suitable filtering material such, for example, as rock wool, cork, or the like, is enclosed within a fabric bag 16, seamed at its lower end at 18 to a disk of wire mesh 20, providing a perforated bottom for the cartridge. At its upper end this bag is gathered, as indicated at 22, to form a top closure. At its lower portion the bag is surrounded and tightly compressed by a sheet metal cylinder 24 provided with numerous perforations 26 throughout its area. The bag bulges over the top of this cylinder, and the bulge is increased by pressure as hereinafter described. In order to facilitate removal of the cartridge from the casing, there is provided a wire bail, soldered or otherwise secured to the cylinder 24 and extending about the top of the cartridge. The casing is closed in conventional fashion by means of a cover 30 carrying a semispherical, perforated metal member 32 adapted to compress the cartridge when the cover is forced downwardly by the conventional tightening means indicated at 34 which may, for example, be of the type illustrated in my Patent No. 1,910,747, dated May 23, 1933. A gasket 26 prevents leakage between the cap and the walls of the casing.

When the device is assembled as illustrated in the figure, the cartridge is pressed downwardly and bulges, as indicated at 38, over the top of the metal cylinder 24 into tight engagement with the inner wall of the casing. The cylinder 24 is made to have slight but appreciable clearance with the walls of the casing as indicated and hence tight engagement of the cartridge with the wall occurs only through the limited region indicated at 38. As compared with cartridges the exterior of which is solely a fabric bag, there is thus far less friction with the walls and the cartridge may be readily placed into and removed from the casing.

In the operation of this filter so long as the cartridge is a new one, the oil flow from the sediment chamber will be primarily through the wire mesh bottom 20, the flow taking place upwardly through the cartridge and passing eventually through the perforations in the member 32 to the outlet 6. As dirt accumulates in the filter, however, greater resistance to flow will be encountered and the oil which is under high pressure will thereupon force the cartridge upwardly to a greater or less extent from the seat provided at 10. The oil thereupon may flow about the exterior of the cylinder 24, passing into the filter through the openings 26 and there finding substantially clean filtering material, since the dirt will have primarily accumulated to a major extent in the lower portion of the cartridge adjacent the screen 20. Thus, a much more effective use is made of all of the filtering material which is provided and the life of the cartridge correspondingly increased.

The extended vertical clearance space provided outside the cylinder 24 also permits quite effective settling of sediment from the oil, since settling depends upon the time of slow flow prior to filtration.

It will be evident that the details of the cartridge may vary from those indicated. While the fabric bag has been shown as extended through the cylinder, it will be evident that it may be secured only to the top of this cylinder, the metallic cylinder itself, if the holes are sufficiently small, serving to prevent any loss or protrusion of the filtering material. In such case the wire mesh, or other type of perforated material, may be formed integral with or secured directly to the cylinder 24.

In Figure 2 there is illustrated an alternative form of the invention particularly adapted to smaller filtering units. In this case the filter casing is indicated at 40 and is provided with an inlet opening 42 at the central part of the bottom thereof, and an outlet opening 44 adjacent its top. The opening 42 is provided in a fitting 46 of the form illustrated, which is provided with a seating surface 48 engageable by the dished portion of the bottom 50 of the removable cartridge. The central portion of this bottom 50 is flat and perforated, as indicated in Figure 2.

The removable cartridge in this instance takes the form of a can of cylindrical shape, generally indicated at 54, provided with the bottom 50 already mentioned and a perforated top 56. The top and bottom may be secured to the cylindrical can in any suitable fashion commonly used in forming a can closure. A bail 57, provided at the top permits its ready removal from the casing. Within the can 54 there is located what might be considered the filtering element proper 66, which has substantially the form of the removable filter cartridge of the previously described embodiment. It comprises, for example, a wire mesh spiral face with interposed filtering material 70, such as cotton waste, or the like. This wire and waste are enclosed within a bag 72, the lower portion of which is surrounded, as indicated, by a perforated metallic cylinder 74 corresponding to the cylinder 24. A wire mesh bottom 76 similar to bottom 20 is also provided and rests upon a loose perforated plate or disk 78, which in turn rests upon the portion 52 of the bottom, being preferably slightly spaced upwardly by upwardly directed flanges surrounding the openings in 52 and formed at the time of production of these openings. The top of the bag is closed by covering and is located within the can under such compression as will cause the upper portion of the bag to press outwardly against the can walls. The can is held downwardly tightly against the seat 48 by means of a wire spring 58 carried by the casing cap 60, which is pressed downwardly with the interposition of a gasket by means indicated at 62 similar to that of said prior patent.

In the operation of this form of cartridge the can 54 is normally held downwardly against the seat 48 so that all of the entering oil must pass through the openings in the central portion 52 of the bottom and thence through the openings in the plate 78 and through the wire mesh 76 into the filtering unit. When, as in the other modification, dirt accumulates to such an extent as to clog the lower portion of the filter, the unit comprising the bag 66 will be raised from the plate 78 and the oil will pass about the cylinder 74 and through its perforations into the filter. In this case also there is provided a sediment chamber of substantially vertical extent between the cylinder 74 and the adjacent but slightly spaced walls of the can. In this case there is also a safety provision so that the oil may reach the engine parts to be lubricated even if the filter becomes so badly clogged as to prevent substantial passage of oil through it. In such case the pressure beneath the can will rise to such an extent that the can will be lifted from its seat 48, whereupon the oil can pass about the can to the opening 44.

By reason of the illustrated shape of the bottom of the can there is provided a large sediment space below the perforated disk 78. In this there will accumulate without clogging the filter large particles of dirt which may be carried by the oil.

It will be obvious that various changes may be made in the embodiment of the invention without departing from its scope.

What I claim and desire to protect by Letters Patent is:

1. An oil filter comprising a housing member having inlet and outlet openings at opposite ends thereof, a cartridge within said housing member between said openings, and means applying endwise pressure to said cartridge, said cartridge comprising a cylindrical, relatively stiff confining member, means providing a fabric wall surmounting said cylindrical member, and filtering material within both said member and said fabric wall, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter.

2. An oil filter comprising a housing member having inlet and outlet openings at opposite ends thereof, a cartridge within said housing member between said openings, and means applying endwise pressure to said cartridge, said cartridge comprising a cylindrical, relatively stiff confining member having openings therein, means providing a fabric wall surmounting said cylindrical member, and filtering material within both said member and said fabric wall, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter.

3. An oil filter comprising a housing member having inlet and outlet openings at opposite ends thereof, a cartridge within said housing member between said openings, and means applying endwise pressure to said cartridge, said cartridge comprising a cylindrical, relatively stiff confining member, means providing a fabric wall surmounting said cylindrical member, filtering material within both said member and said fabric wall, and a metallic bottom for said cartridge having openings therein, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter.

4. An oil filter comprising a housing member having inlet and outlet openings at opposite ends thereof, a cartridge within said housing member between said openings, and means applying endwise pressure to said cartridge, said cartridge comprising a cylindrical, relatively stiff confining member, means providing a fabric wall surmounting said cylindrical member, and filtering material within both said member and said fabric wall, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter, and said housing member having a seat about said inlet opening and on which said cartridge normally rests to restrict flow of oil about said cylindrical member, said endwise pressure applying means yieldingly urging said cartridge upon said seat, the cartridge being raised by oil pressure so that flow may take place about said cylindrical member.

5. An oil filter comprising a housing member having inlet and outlet openings at opposite ends thereof, a cartridge within said housing member between said openings, and means applying endwise pressure to said cartridge, said cartridge comprising a cylindrical, relatively stiff confining member having openings therein, means providing a fabric wall surmounting said cylindrical member, and filtering material within both said member and said fabric wall, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter, and said housing member having a seat about said inlet opening and on which said cartridge normally rests to restrict flow of oil about said cylindrical member, said endwise pressure applying means yieldingly urging said cartridge upon said seat, the cartridge being raised by oil pressure so that flow may take place about and through said cylindrical member.

6. An oil filter comprising a housing member having inlet and outlet openings at opposite ends thereof, a cartridge within said housing member between said openings, and means applying endwise pressure to said cartridge, said cartridge comprising a cylindrical, relatively stiff confining member, means providing a fabric wall surmounting said cylindrical member, filtering material within both said member and said fabric wall, and a metallic bottom for said cartridge having openings therein, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter, and said housing member having a seat about said inlet opening and on which said cartridge normally rests to restrict flow of oil about said cylindrical member, said endwise pressure applying means yieldingly urging said cartridge upon said seat, the cartridge being raised by oil pressure so that flow may take place about said cylindrical member.

7. An oil filter comprising a housing member having inlet and outlet openings at opposite ends thereof, a cartridge within said housing member between said openings, and means applying endwise pressure to said cartridge, said cartridge comprising a cylindrical, relatively stiff confining member having openings therein, means providing a fabric wall surmounting said cylindrical member, filtering material within both said member and said fabric wall, and a metallic bottom for said cartridge having openings therein, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter, and said housing member having a seat about said inlet opening and on which said cartridge normally rests to restrict flow of oil about said cylindrical member, said endwise pressure applying means yieldingly urging said cartridge upon said seat, the cartridge being raised by oil pressure so that flow may take place about and through said cylindrical member.

8. An oil filter comprising a casing having inlet and outlet openings, a housing member between said inlet and outlet openings of the casing and also having inlet and outlet openings, and a cartridge within said housing member between the inlet and outlet openings thereof, said cartridge comprising a cylindrical, relatively stiff confining member, means providing a fabric wall surmounting said cylindrical member, and filtering material within both said member and said fabric wall, said cylindrical member having substantial clearance with the walls of said housing member, and said fabric wall bulging outwardly under the action of the filtering material therein and said endwise pressure to engage the walls of said housing member to cut off communication between the inlet and outlet openings of the latter, said casing being provided with a seat member on which said housing member normally rests to cut off communication between the interior of said seat and the outlet of the casing, and means for yieldingly pressing said housing member upon said seat whereby liquid pressure exerted inside said seat may lift said housing member and permit oil to bypass to the outlet from the casing.

9. An oil filter cartridge comprising an open-ended, cylindrical, relatively stiff confining member, means providing a fabric wall extending substantially above said cylindrical member, and filtering material within both said member and said fabric wall, said fabric wall being arranged to bulge outwardly over the top of said cylindrical member under the action of the filter material therein and applied axial pressure when the cartridge is located within a casing.

10. An oil filter cartridge comprising an open-ended, cylindrical, relatively stiff confining member having openings in the cylindrical walls thereof, means providing a fabric wall extending substantially above said cylindrical member, and filtering material within both said member and said fabric wall, said fabric wall being arranged to bulge outwardly over the top of said cylindrical member under the action of the filtering material therein and applied axial pressure when the cartridge is located within a casing.

11. An oil filter cartridge comprising an open-ended, cylindrical, relatively stiff confining member, means providing a fabric wall extending substantially above said cylindrical member, filtering material within both said member and said fabric wall, and a metallic bottom for said cartridge having openings therein, said fabric wall being arranged to bulge outwardly over the top of said cylindrical member under the action of the filtering material therein and applied axial pressure when the cartridge is located within a casing.

WILLIAM G. BURHANS.